Feb. 27, 1940. D. L. KAUFMAN 2,191,925
REFRIGERATING APPARATUS
Original Filed April 30, 1935   2 Sheets-Sheet 1

INVENTOR.
Daniel L. Kaufman
BY
Spencer Hardman and Fehr
ATTORNEYS

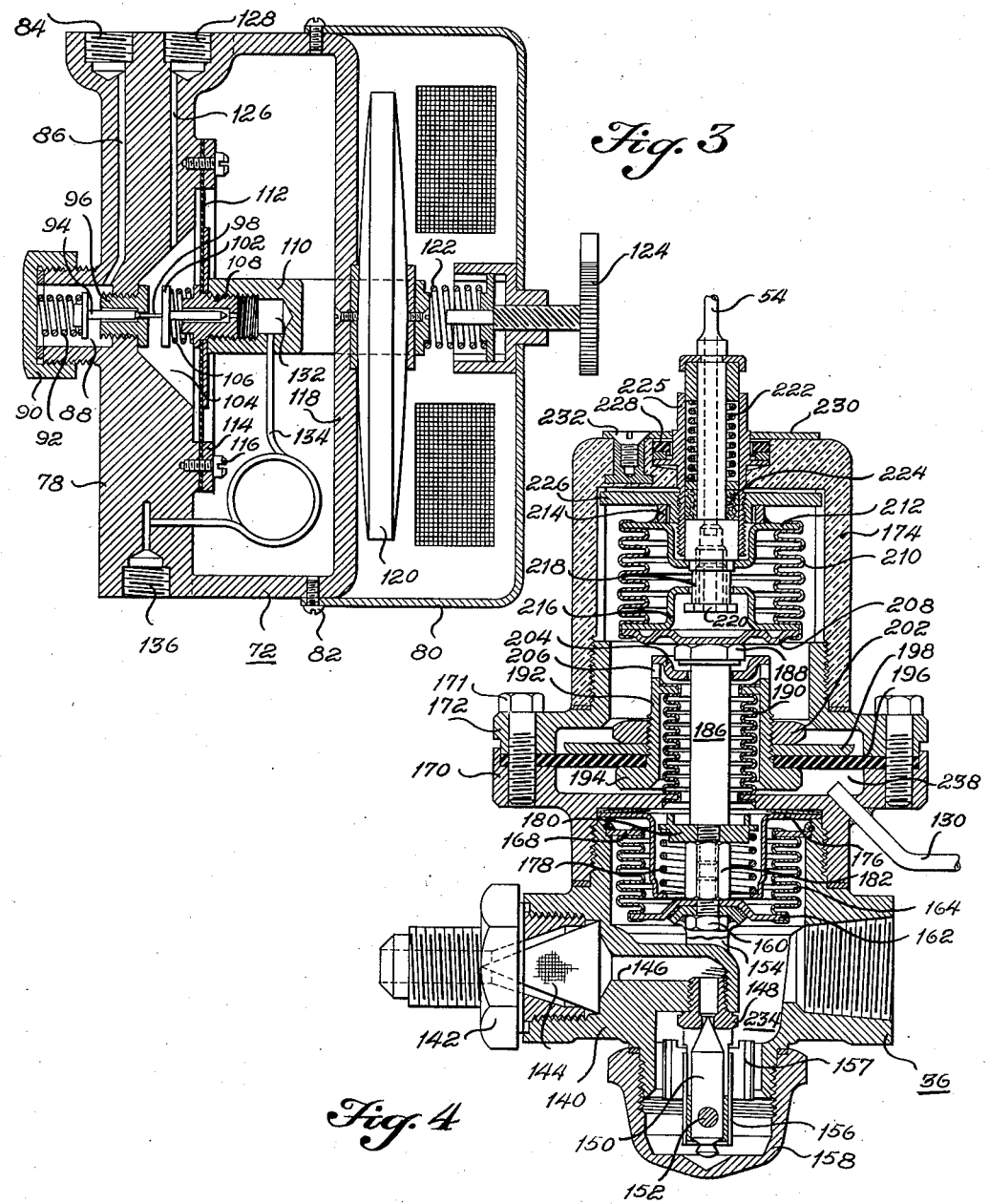

Patented Feb. 27, 1940

2,191,925

UNITED STATES PATENT OFFICE 2,191,925

REFRIGERATING APPARATUS

Daniel L. Kaufman, Dayton, Ohio, assignor to General Motors Corporation, Dayton, Ohio, a corporation of Delaware Application April 30, 1935, Serial No. 18,992
Renewed March 27, 1937

16 Claims. (Cl. 62—3)

This invention relates to refrigerating apparatus and more particularly to control means therefor.

In multiple refrigerating systems where individual remote control of a different evaporating means is desired, it has been customary to employ a separate valve operated by a remote control means in order to control the effect of the evaporating means so as to maintain the medium to be cooled at the desired temperature. Several common forms of such types of control have been evolved—one in which a source of air under pressure is controlled by a thermostatically controlled air valve which controls the application of air pressure to a refrigerant valve located in series with the expansion valve of a refrigerating system. Another form has been to use a solenoid valve in series with the expansion valve which is controlled by a thermostatic switch means. These forms are satisfactory, but are to a certain extent complicated and expensive. These forms also require an additional source of power or energy for their control.

It is an object of my invention to provide a refrigerating system with an improved control means which is simpler and less expensive than the control means of similar capabilities it can replace.

It is a further object of my invention to provide an individual highly sensitive control means which will individually control the evaporating means of a multiple refrigerating system and which will be more simple and less expensive than prior systems of this type.

It is another object of my invention to provide a refrigerating system with an expansion valve capable of performing normal functions of an expansion valve and also capable of performing the functions of a shut-off valve actuated by a sensitive remote control.

It is another object of my invention to provide a sensitive control system for the evaporating means of a refrigerating system which is operated by the pressure of the refrigerant, but controlling independently thereof.

Further objects and advantages of the present invention will be apparent from the following description, reference being had to the accompanying drawings, wherein a preferred form of the present invention is clearly shown.

In the drawings:

Fig. 3 is a sectional view of one of the gas control valves shown in Fig. 1; and Fig. 4 is a vertical sectional view of one of the expansion valves shown in Figs. 1 and 2.

Essentially, in my disclosure, I have shown a multiple refrigerating system provided with a thermostatic expansion valve for controlling the normal flow of refrigerant through the evaporators which is also provided with a pressure actuatable means for enabling the thermostatic expansion valve to act as a shut-off valve. The actuation of different pressure actuatable means of the thermostatic expansion valve is controlled by a thermostatic control valve provided with a peculiar multiple valve construction wherein when the temperature is low, high pressure refrigerant gas from the receiver is permitted to flow through the control valve to the pressure chamber within the expansion valve for causing the expansion valve to close and act as a remote controlled shut-off valve. When the temperature is high, the thermostatic control valve will permit the gas to be discharged from the pressure actuating valve in the expansion valve to the low pressure portion of the refrigerating system, while the high pressure gas from the receiver is shut off. This permits the expansion valve to operate normally as any other ordinary thermostatic expansion valve would do.

Figure 2:
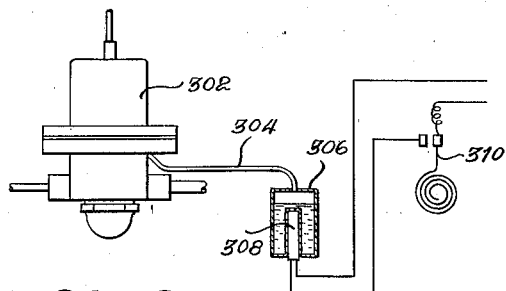
Fig. 2 is a modified form of control scheme embodying my invention.

In Fig. 2 there is shown another form of control system in which the pressure actuating chamber of the thermostatic expansion valve is connected to a chamber containing a volatile liquid, preferably the same as the refrigerant in the system, provided with an electric heater whose energization is controlled by a sensitive theremostatic switch for controlling the shutting off of the expansion valve.

Figure 1:
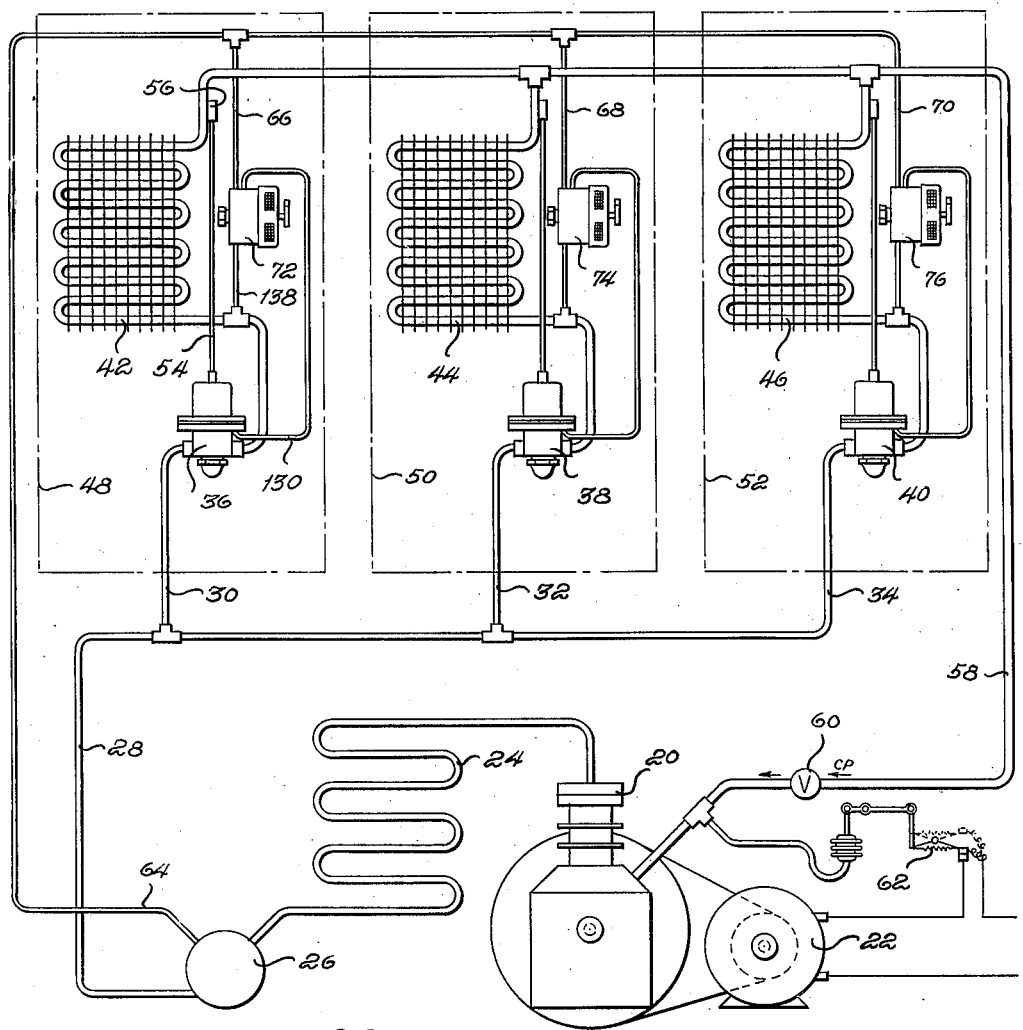
Fig. 1 is an illustration, partly diagrammatic of a multiple refrigerating system embodying my invention.

Referring now to the drawings, and more particularly to Fig. 1, there is shown a refrigerating system having a high pressure portion including a compressor 20 driven by an electric motor 22 for compressing the refrigerant and for forwarding the compressed refrigerant to a condenser 24 where the compressed refrigerant is liquefied and collected in a receiver 26. The liquid is conducted from the lower portion of receiver 26 through a supply conduit 28 and branch conduits 30, 32 and 34 to the expansion valves 36, 38 and 40, which constitute one limit of the high pressure portion of the system, while the compressor constitutes the other limit of the high pressure portion of the refrigerating system.

The low pressure portion of the refrigerating system extends between the expansion valves 36, 38 and 40 and the compressor 20. The expansion valves 36, 38 and 40 individually control the flow of liquid refrigerant from the high pressure portion to their respective evaporating means 42, 44 and 46, each of which including their expansion valves are located in the respective chambers to be cooled, 48, 50 and 52. The expansion valves 36, 38 and 40 are of the automatic thermostatic type having a diaphragm responsive to the pressure within the evaporating means which tends to close the expansion valve when the pressure within the evaporating means is high and which has a second diaphragm forming a part of the chamber which is connected by a small tube designated by the reference character 54 in the expansion valve 36 which is connected to a thermostatic bulb 56 which contains a volatile liquid and which is placed in direct heat exchange relation with a refrigerant conduit at the outlet of the evaporator 42. This second diaphragm, together with the tube 54 and the thermostatic bulb 56 forms the thermostatic portion of the expansion valve and tends to cause the valve to open when the temperature of the portion of the conduit with which the thermostatic bulb 56 is in contact is high. The expansion valves 38 and 40 are similarly constructed and have their thermostatic bulbs similarly placed.

The evaporators 42, 44 and 46 discharge into a common return conduit 58 which connects to the inlet of the compressor 20. The conduit 58 is provided with a valve 60 which throttles the evaporated refrigerant flowing to the compressor when necessary in order to prevent the overloading of the compressor and the motor 22 and to maintain a constant pressure within the evaporating means. The motor 22 is controlled by a snap acting switch means 62 operated according to the pressure existing in the return conduit 58.

Thus far, an ordinary multiple refrigerating system of the type now in general use has been described. Such a system while it would maintain a substantially constant evaporator temperature within the evaporating means 42, 44 and 46 would not maintain a constant temperature necessarily within the enclosures 48, 50 and 52 when the amount of heat leakage would fluctuate. It is, therefore, necessary to provide an additional control in order to vary the amount of refrigeration supplied by the individual evaporating means in accordance with the requirements which are, of course, dependent upon the amount of heat leak.

Heretofore, it has been thought necessary to provide an additional valve in series with the expansion valve often located immediately after the expansion valve, but sometimes located at the outlet of the evaporating means for controlling the refrigerating effect of the evaporating means in accordance with the requirements. Such a valve has sometimes been controlled by an electro-magnet which, in turn, was controlled by a sensitive switch means, often an ordinary room thermostat electric switch. Others have provided a separate air pressure system controlled by a special room thermostatic valve which controlled the application of pressure to a diaphragm within the valve structure to cause the opening and closing of the valve in accordance with the requirements. Such schemes, however, required the installation of an additional valve which sometimes caused additional trouble and the last mentioned scheme also had the disadvantage of the possibility of having air leak through the valve into the refrigerating system, as well as required an additional source of power, either air pressure or electrical conduits connected to the electrical system of the building.

According to my invention, I connect a conduit of small diameter designated by the reference character 64 to the upper portion of the receiver 26 which usually contains warm gaseous refrigerant at the pressure existing upon the high side of the refrigerating system. However, this conduit could be connected to any other desired portion of the high side of the refrigerating system. This conduit 64 is connected by the branch conduits 66, 68 and 70 to the peculiar thermostatic control valves 72, 74 and 76 which are located within the enclosures 48, 50 and 52 respectively.

Referring now more particularly to Fig. 3 for a specific disclosure of one form of such valve, there is disclosed a cylindrical structure including a casting 78 and a ventilated sheet metal cover 80 fastened to the casting by the screws 82. The casting 78 is provided with an inlet 84 connected to the branch conduit 66 which supplies the warm high pressure refrigerant gas to the valve. Extending from the inlet 84 is a small passage 86 extending to a valve chamber 88 which is formed in a boss closed by a cap 90.

Within this valve chamber is a compression type coil spring 92 which urges a tack shaped valve 94 into engagement with its seat which is provided in the threaded bushing 96. The valve 94 is provided with a stem 98 which extends through the valve opening in the bushing 96 and engages a second somewhat similarly shaped valve 102. This valve 102 is located within a cone shaped chamber 104 and is provided with a compression spring 106 which is weaker than the compression spring 92 and acts in opposition to the spring 92. The valve 102 extends into a threaded valve bushing 108 which is threaded into a yoke 110 and which is provided with a flange which fastens the yoke 110 to a diaphragm 112 which forms a wall of the cone shaped chamber 104 and is fastened to and sealed to the portion of the casting 78 surrounding the cone shaped chamber 104 by a ring 114 and screws 116. This diaphragm may be of metal, but as shown, is a thin sheet of rubber-like material capable of resisting the action of refrigerant.

The yoke 110 extends through a wall 118 of the casting 78 and is connected to the opposite side of a pancake type thermostatic diaphragm element 120 which contains a volatile fluid. The side of the element 120 nearest the two valves is fastened to the wall 118 while the opposite or far side of the diaphragm is connected to the yoke 110. An adjusting spring 122 is provided which exerts pressure upon the yoke 110 and the element 120. This compression spring is adjusted by a manual manipulating means 124 so as to cause the valve to be actuated at different desired temperatures within its range.

When the temperature of the thermostatic element 120 is high, the element expands and pulls the yoke 110 to the right as viewed in Fig. 3. This permits the valve 102 to move away from its seat and also permits the spring 92 to hold the valve 94 in closed position to prevent any high pressure gas from flowing through the valve. When the thermostatic element 120 is cooled, it assumes a partially collapsed position and the spring 122 moves the yoke 110 to the left, thus closing the valve 102 and after the closing of the valve 102, opening the valve 94 through the medium of the pin 98 against the pressure of the compression spring 92. This permits high pressure gas to flow from the inlet 84 through the passage 86 and the chamber 88 past the valve 94 into the cone shaped chamber 104. Extending from the cone shaped chamber 104 is a small passage 126 which extends to an outlet 128 which connects to a small tube 130 which extends into the pressure actuating chamber of the expansion valve which is capable when filled with high pressure gas of moving the expansion valve to closed position. This causes the pressure actuating chamber of the valve to be filled with high pressure gas.

When the thermostatic element again becomes warm by reason of the shutting off of the flow of liquid refrigerant to the expansion coil, the thermostatic element expands first permitting the closing of the valve 94 under the influence of the spring 92 and then permitting the opening of the valve 102 under the influence of the weaker spring 106. This permits the high pressure gas to be discharged from the pressure actuating chamber of the expansion valve through the inlet 128, the passage 126, into the cone shaped chamber 104 and past the valve 102 into a small chamber 132 in the yoke 110 which is connected by tube 134 provided with a coil for flexibility which is connected to a valve outlet 136 which in turn connects to the tube 138 connected to the low side of the refrigerating system for receiving the discharge of high pressure gas from the pressure actuating chamber of the expansion valve.

Referring now more particularly to Fig. 4 which shows a vertical sectional view of the expansion valve 36, there is shown a valve body 140 having a nipple 142 threaded therein which holds a cone shaped screen strainer 144 in place and also connects to the branch supply conduit 30. Extending inwardly from the cone-shaped member is a projecting portion provided with a passage 146 therein having a threaded valve bushing 148 in its lower side. Cooperating with the opening in the valve bushing 148 is a needle valve 150 which is connected by a pin 152 to a block which is held by the yoke 154. This block is prevented from turning by a pair of sheet metal clips 156 provided with flanges for engaging the block and engaging the side of the yoke. These sheet metal clips each hold a spring sheet metal centralizing and dampening member 157 which engages the walls of the valve body to centralize the yoke 154 and dampen its movement. The bottom of the valve body is closed by a cap 158 threaded thereon. The upper end of the yoke 154 is connected by a machine or cap screw 160 extending through the end plate 162 of the bellows 164 and threaded into the hexagonal member 182. The bellows 164 is connected at its upper end to a ring shaped flange 168 fastened to the upper wall of the valve body 140.

Threaded to the upper portion of the valve body 140 is a flange member 170 which has an inner flange closing the top of the valve body and an outer flange to which by cap screws 171 is connected a second or upper flange member 172 to which in turn is connected by a threaded connection an insulating cap member 174. Held between the upper edge of the valve body and the inner flange of the flange member 170 is a bellows stop 176 provided with an inwardly directed flange which receives the lower end of a compression spring 178 which has its upper end engaging a generally flat circular member 180 which is fastened to a hexagonal connecting member 182 located within the convolutions of the coil spring 178 and the bellows 164 which receives the screw 160 at its lower end and which receives a threaded portion extending from a vertical pin 186 provided with a hexagonal upper flange portion 188. This member 186 together with the disc 180, the hexagonal member 182, the end plate 162, the screw 160, the yoke 154 and the needle valve 150 are all connected together so that they move as a unit in a vertical direction. Connected to the inner fringe of the flange member 170 is a small bellows 190 connected at its upper end to a threaded member 192 provided with a flange 194 at its lower end against which is clamped the inner portion of a rubber-like diaphragm 196 which is backed up by a reinforcing disc 198 and held by a nut 202 which is threaded upon the threaded portion of the threaded member 192. The upper portion of the threaded member 192 is provided with an inwardly directed flange 204 which is adapted to engage in a lost motion arrangement the lower face of the hexagonal head 188 of the member 186. It is also provided with apertures 206 beneath the flange to permit the free flow of fluid from the upper interior portion of the lower interior portion of the valve.

Resting upon the head 188 of the member 186 is the end plate 208 of the thermostatic bellows 210. The upper end of the thermostatic bellows is connected to an upper end plate 212 which is soldered to a ring 214.

Immediately above the lower end plate 208 is an inner plate 216 provided with a flanged aperture in the center portion which surrounds a vertical member 218 which is connected by a lost motion connection to the inner plate 216 by the head of the hollow screw 220 which is threaded into its lower end. The member 218 has a stepped portion which is received within an aperture in the upper end plate 212 of the thermostatic bellows. The interior of this member 218 is hollow and at its extreme upper end is connected to the thermostatic tube 54. Surrounding the upper end of this member 218 is a compression spring 222 which presses against the packing 224 for providing a seal between the member 218 and an adjusting member 225 which surrounds the member 218 and is provided with an outer hexagonal adjusting head. This adjusting member 225 is provided with a threaded lower portion which is threaded into a threaded flange of a disc 226 held from rotation by vertical grooves within the member 174 which exerts a force upon the ring 214 to hold the upper end of the bellows from movement and for moving the upper end of the bellows 210 upwardly or downwardly as desired. In order to provide a seal between the adjusting member 225 and the insulating member 174 there is provided a gasket 228 held in place by a top plate 230 fastened by the screws 232.

When the thermostatic bulb 56 becomes warm, the volatile fluid therein expands and increases the pressure within the thermostatic portion of the valve, thus causing the bellows 210 to expand and to press upon the member 186 which in turn will tend to move the needle valve 150 downwardly to open position. Also, when the thermostatic bulb 56 is cooled, the volatile fluid contracts and permits the bellows 210 to contract, thus removing its influence from the needle valve 150. The needle valve 150 is normally operated by the pressure within the low pressure side 234 of the valve body which is connected directly to the evaporator. This evaporator pressure is exerted upon the bellows 178 which tends to close the needle valve 150 when the pressure is high and to open the needle valve when the pressure is low.

The pressure actuating chamber 238 within the thermostatic expansion valve is formed by the flange member 170, the sealing bellows 190, the threaded member 192 and the diaphragm 196. The tube 130 which extends from the thermostatic control valve 72 to the expansion valve extends into the chamber. When the control valve 72 admits refrigerant to the conduit 130, this refrigerant fills the pressure actuating chamber 238 and exerts a force upon the diaphragm which acts along with the bellows 178 to close the needle valve 150. The diaphragm 196 has such an area that it is ample to overcome any pressure exerted by the thermostatic bellows 210. This diaphragm preferably is made of a rubber-like material which will withstand the action of refrigerant such as a chloroprene derivative known by the trade name of "Duprene" or a rubber substitute known by the name of "Thyokol." However, instead of this a flexible metallic diaphragm may be used if desired. It should be noted that the threaded member 192 forms a lost motion connection with the head 188 of the member 186 which is connected to the yoke carrying the needle valve so that when there is no pressure within the pressure actuating chamber 238, the diaphragm 196 of the threaded member 194 will have no effect upon the operation of the expansion valve. It is only when the pressure is exerted within the chamber 238 that the valve will be affected and in that case the valve will be moved to closed position, provided sufficient pressure is applied within the chamber 238.

Thus, in this form of my invention, the system operates so as normally to keep the evaporating means filled with liquid refrigerant under the normal control of the thermostatic expansion valve. My improved control system operates in connection with this system to connect the pressure actuating chamber in the thermostatic expansion valve either with the high pressure portion of a refrigerating system to shut off the flow of liquid refrigerant to the evaporating means when the temperature within the compartment served by such evaporating means is low and when the temperature is high serves to connect the low pressure side of the system with the pressure actuating chamber of the thermostatic expansion valve to withdraw the pressure from the pressure actuating chamber and to cause the diaphragm of the pressure actuating chamber to be retracted to a position where it will permit the thermostatic expansion valve to operate in a normal manner and to keep the evaporating means filled with liquid refrigerant up to the thermostatic bulb 56.

In Fig. 2, I have illustrated another form of the invention which includes a thermostatic expansion valve 302 similar to the expansion valve 36 shown in Figs. 1 and 4 and similarly connected into a refrigerating system. This expansion valve 302 has its pressure actuating means connected by a small tube 304 to a chamber 306 containing a volatile liquid and provided with an electric heater 308 connected in series with a sensitive thermostatic switch 310 similarly located within or responsive to the temperature of the medium to be cooled as is the control valve 72. Thus, when the temperature of the medium to be cooled is low, the switch 310 moves to close the circuit, thus energizing the heater 308 to evaporate or boil the volatile liquid within the chamber 306 which causes vapor under pressure to be conducted through the conduit 304 into the pressure actuating chamber of the valve 302 to close the expansion valve 302 to stop the flow of refrigerant into the evaporating means. When the temperature is high, the switch 310 will open to break the circuit and deenergize the electric heater 308 which will permit the volatile liquid within the chamber 306 to be cooled, thus reducing the pressure within the pressure actuating chamber of the thermostatic valve 302 in order to permit the valve 302 to operate normally and fill the evaporating means with liquid refrigerant. With this system, an electrical control is provided which makes the same dual use of the expansion valve as the first embodiment disclosed in the other figures.

While the form of embodiment of the present invention as herein disclosed constitutes a preferred form, it is to be understood that other forms might be adopted, all coming within the scope of the claims which follow.

What is claimed is as follows:

1. Refrigerating apparatus including a refrigerating circuit comprising an evaporating means for cooling a medium to be cooled, refrigerant liquefying means for liquefying the refrigerant at a higher pressure than the pressure within the evaporating means for supplying liquid refrigerant to the evaporating means, valve means having an actuating means separate from the refrigerating circuit, means forming a refrigerant passage separate from said refrigerating circuit and being actuated by refrigerant pressure within the liquefying means for controlling the circulation of refrigerant through the evaporating means, and a second valve means for controlling the flow of refrigerant throughout said refrigerant passages connecting the actuating means and the liquefying means for controlling the actuation of the first valve means by the refrigerant pressures.

2. Refrigerating apparatus including an evaporating means for cooling a medium to be cooled, refrigerant liquefying means for liquefying the refrigerant at a higher pressure than the pressure within the evaporating means for supplying liquid refrigerant to the evaporating means, valve means connected by a separate control passage with one of said means and actuated by refrigerant pressures within one of said means for controlling the circulation of refrigerant through the evaporating means, and a second valve means responsive to the temperature of the medium being cooled for controlling the flow of refrigerant through said separate control passage for controlling the actuation of the first valve means by the refrigerant pressures.

3. Refrigerating apparatus including a low pressure portion including a refrigerating circuit comprising an evaporating means for cooling a medium, a high pressure portion including a refrigerant liquefying means for supplying liquid refrigerant to and for withdrawing evaporated refrigerant from the evaporating means, valve means for controlling the flow of refrigerant through the evaporating means, said valve means having an actuating chamber, means separate from the refrigerating circuit for conducting refrigerant between both of said portions and said actuating chamber for actuating said valve means.

4. Refrigerating apparatus including a refrigerating circuit comprising a low pressure portion including an evaporating means for cooling a medium, a high pressure portion including a refrigerant liquefying means for supplying liquid refrigerant to and for withdrawing evaporated refrigerant from the evaporating means, valve means for controlling the flow of refrigerant through the evaporating means, said valve means having means forming an actuating chamber separate from the refrigerating circuit, means for conducting refrigerant from said high pressure portion to said actuating chamber for actuating said valve means, and a second valve means for controlling the flow of fluid through said refrigerant conducting means for actuating said actuating chamber to actuate said first mentioned valve means.

5. Refrigerating apparatus including a low pressure portion including an evaporating means for cooling a medium, a high pressure portion including a refrigerant liquefying means for supplying liquid refrigerant to and for withdrawing evaporated refrigerant from the evaporating means, valve means for controlling the flow of refrigerant through the evaporating means, said valve means having an actuating chamber, means for conducting refrigerant from said high pressure portion to said actuating chamber for actuating said valve means, and means for discharging fluid from said actuating chamber into the low pressure portion, said conducting means being arranged in the form of a by-pass around said valve means.

6. A control means for controlling the flow of refrigerant through an evaporating means comprising a valve, a pressure responsive means responsive to the pressure of the refrigerant for operating the valve, a temperature responsive means responsive to the temperature of the evaporating means, said temperature responsive means being operatively connected to said valve for controlling the valve, and a second temperature responsive means responsive to the temperature of the fluid cooled by the evaporating means operably connected to said valve for controlling the valve, one of said temperature responsive means including means responsive to an increase in pressure tending to open the valve and the other being responsive to an increase in pressure tending to close the valve.

7. Refrigerating apparatus including a refrigerant evaporating means for cooling a medium, means for circulating refrigerant through the evaporating means, and a valve for controlling the circulation of refrigerant through the evaporating means, said valve having a thermostatic actuating means including a thermostatic bulb mounted in metallic heat exchange relation with said evaporating means, said valve having another actuating means separate from the thermostatic actuating means responsive to conditions of the medium to be cooled, said actuating means being constructed to close the valve in response to an increase in pressure.

8. Refrigerating apparatus including a cooling unit for cooling a medium, means for circulating a cooling fluid through the cooling unit, a valve for controlling the circulation of the fluid through the unit, said valve having two separate actuating chambers, a thermostatic bulb, conduit means connecting one of said actuating chambers and said bulb; said bulb, conduit means and said one actuating chamber being charged with a means for creating a pressure in accordance with the temperature of said bulb, a second conduit means connecting the second actuating chamber with the circulating means, and means responsive to the temperature of the medium being cooled for controlling the flow of fluid through said second conduit means.

9. Refrigerating apparatus including a cooling unit for cooling a medium, means for circulating a cooling fluid through the cooling unit, a valve for controlling the circulation of the cooling fluid through the cooling unit, said valve having two separate actuating chambers, a thermostatic bulb, conduit means connecting one of said actuating chambers and said bulb; said bulb, conduit means and said one actuating chamber being charged with a means for creating a pressure in accordance with the temperature of said bulb, a second conduit means connecting a second actuating chamber with the circulating means, and means for controlling the flow of fluid through said second conduit means.

10. Refrigerating apparatus including an evaporating unit for cooling a medium, said evaporating unit having an inlet and an outlet, a valve located at the inlet of the evaporating means for controlling the flow of refrigerant into the evaporating unit, said valve having a thermostatic actuating means including a thermostatic bulb mounted in metallic heat exchange relation with the refrigerant issuing from the outlet of the evaporating unit, said valve having another actuating means separate from the thermostatic actuating means responsive to the temperature of the medium being cooled, said another actuating means being located directly between the thermostatic actuating means and the valve.

11. Refrigerating apparatus including an evaporating unit for cooling a medium, said evaporating unit having an inlet and an outlet, a valve located at the inlet of the evaporating unit for controlling the flow of refrigerant into the evaporating unit, said valve having a thermostatic actuating means including a thermostatic bulb, said valve having another actuating means separate from said thermostatic actuating means provided with an actuating chamber also separate from said thermostatic actuating means arranged to move the valve toward closed position upon an increase in pressure, conduit means connected to said actuating chamber for conducting fluid to and from said actuating chamber, and thermostatically controlled valve means for controlling the flow of fluid through said conduit means.

12. Refrigerating apparatus including an evaporating unit for cooling a medium, a valve for controlling the flow of refrigerant through the evaporating unit, said valve having a thermostatic actuating means including a thermostatic bulb, said valve having another actuating means provided with an actuating chamber, conduit means connecting said actuating chamber and said evaporating unit for conducting fluid between said actuating chamber and the evaporating means, and a second valve means for controlling the flow of fluid through said conduit means for controlling the actuation of said another actuating means for actuating said valve.

13. Refrigerating apparatus including a low pressure portion comprising an evaporating means for cooling a medium, a high pressure portion comprising a liquefying means for supplying liquid refrigerant to and for withdrawing evaporated refrigerant from the evaporating means, valve means for controlling the flow of refrigerant through the evaporating means, said valve means including an expansible actuating chamber, means forming a refrigerant passage by-passing said valve means and connecting both of said portions with said actuating chamber to conduct refrigerant between said portions and the chamber, means for selectively controlling the flow of refrigerant between each of said portions and said actuating chamber, and thermostatic means responsive to the temperature of the refrigerant discharged from said evaporating means for controlling the operation of said valve means.

14. Refrigerating apparatus including a refrigerating circuit comprising a low pressure portion including evaporating means and a high pressure portion including liquefying means, valve means for controlling the flow of refrigerant from the high pressure portion, said valve means including means forming an expansible actuating chamber separate from the refrigerating circuit, means forming a refrigerant passage by-passing said valve means and connecting said actuating chamber with each of said portions, and means for controlling the flow of refrigerant through said passage for controlling the actuation of the actuating chamber means.

15. Refrigerating apparatus including a refrigerating circuit comprising a low pressure portion including evaporating means and a high pressure portion including liquefying means, valve means for controlling the flow of refrigerant from the high pressure portion, said valve means including means forming two independent expansible actuating chambers separated from said portions, a thermostat bulb connected to the interior of one of the actuating chambers, a refrigerant conduit means separate from the refrigerating circuit connecting the other expansible actuating chamber with one of said portions, and a second valve means for controlling the flow of refrigerant between said portion and said other actuating chamber for controlling the actuation of the actuating chamber means.

16. Refrigerating apparatus including a low pressure portion comprising an evaporating means for cooling a medium, a high pressure portion comprising a liquefying means for supplying liquid refrigerant to and for withdrawing evaporated refrigerant from the evaporating means, control means for controlling the flow of refrigerant through the evaporating means, said control means including an expansible actuating chamber, a refrigerant passage connecting one of said portions of the refrigerating apparatus with said actuating chamber to conduct refrigerant between one of said portions and the chamber, and a second control means for controlling the flow of refrigerant between said portion and said actuating chamber.

DANIEL L. KAUFMAN.